(12) United States Patent
Schumacher et al.

(10) Patent No.: US 9,585,299 B2
(45) Date of Patent: Mar. 7, 2017

(54) SOWING SHARE

(71) Applicant: Kverneland AS, Kvernaland (NO)

(72) Inventors: Ferdinand Schumacher, Lippetal-Oestinghausen (DE); Volker Schanzenbach, Hagen a. T. W. (DE); Michael Winkelmann, Soest (DE)

(73) Assignee: Kverneland AS, Kvernaland (NO)

( * ) Notice: Subject to any disclaimer, the term of this patent is extended or adjusted under 35 U.S.C. 154(b) by 0 days.

(21) Appl. No.: 14/443,785

(22) PCT Filed: Sep. 23, 2013

(86) PCT No.: PCT/EP2013/069697
§ 371 (c)(1),
(2) Date: May 19, 2015

(87) PCT Pub. No.: WO2014/095106
PCT Pub. Date: Jun. 26, 2014

(65) Prior Publication Data
US 2015/0296698 A1 Oct. 22, 2015

(30) Foreign Application Priority Data
Dec. 18, 2012 (DE) .......... 10 2012 112 567

(51) Int. Cl.
*A01B 63/28* (2006.01)
*A01C 7/20* (2006.01)
(Continued)

(52) U.S. Cl.
CPC .............. *A01B 63/28* (2013.01); *A01B 71/02* (2013.01); *A01C 5/064* (2013.01); *A01C 7/203* (2013.01)

(58) Field of Classification Search
CPC ......... A01C 7/203; A01C 21/00; A01C 5/064; A01B 71/02; A01B 63/28
See application file for complete search history.

(56) References Cited

U.S. PATENT DOCUMENTS

| 5,524,560 | A | 6/1996 | Carter | ............................ 111/200 |
| 8,522,889 | B2 * | 9/2013 | Adams | .................... A01C 7/203 111/136 |

(Continued)

FOREIGN PATENT DOCUMENTS

| DE | 3430135 | 2/1986 | ............... A01C 7/20 |
| DE | 102004048759 | 4/2006 | ............... A01C 7/20 |

(Continued)

OTHER PUBLICATIONS

International Search Report from corresponding International Patent Application No. PCT/EP2013/069697, dated Jan. 8, 2014.

*Primary Examiner* — Jamie L McGowan
(74) *Attorney, Agent, or Firm* — Kusner & Jaffe

(57) ABSTRACT

A coulter with a coulter disc for delivering agricultural materials into soil along one direction F of travel, a height measuring apparatus which is located in the region of the coulter disc for measuring a penetration depth $T_m$ of the coulter disc into the soil, a coulter holder for swivelling holding of the coulter disc on a coulter frame and height setting relative to the coulter frame, the penetration depth T of the coulter disc being controllable/adjustable depending on the measured penetration depth $T_m$.

15 Claims, 2 Drawing Sheets

(51) Int. Cl.
*A01B 71/02* (2006.01)
*A01C 5/06* (2006.01)

(56) References Cited

U.S. PATENT DOCUMENTS

| | | | | |
|---|---|---|---|---|
| 2006/0090680 A1* | 5/2006 | Wendte | ............... | A01O 5/064 |
| | | | | 111/135 |
| 2012/0048160 A1 | 3/2012 | Adams et al. | ............... | 111/163 |
| 2014/0303854 A1* | 10/2014 | Zielke | ............... | A01C 21/00 |
| | | | | 701/50 |
| 2015/0230391 A1* | 8/2015 | Houck | ............... | A01C 7/203 |
| | | | | 701/50 |
| 2015/0334914 A1* | 11/2015 | Zielke | ............... | A01C 21/00 |
| | | | | 701/50 |

FOREIGN PATENT DOCUMENTS

| | | | | |
|---|---|---|---|---|
| EP | 0266527 | | 5/1988 | ............... A01C 7/20 |
| GB | 2056238 | | 3/1981 | ............... A01C 5/06 |
| GB | 2144012 A | * | 2/1985 | ............... A01C 5/062 |
| GB | 2164232 | | 3/1986 | ............... A01C 7/20 |

\* cited by examiner

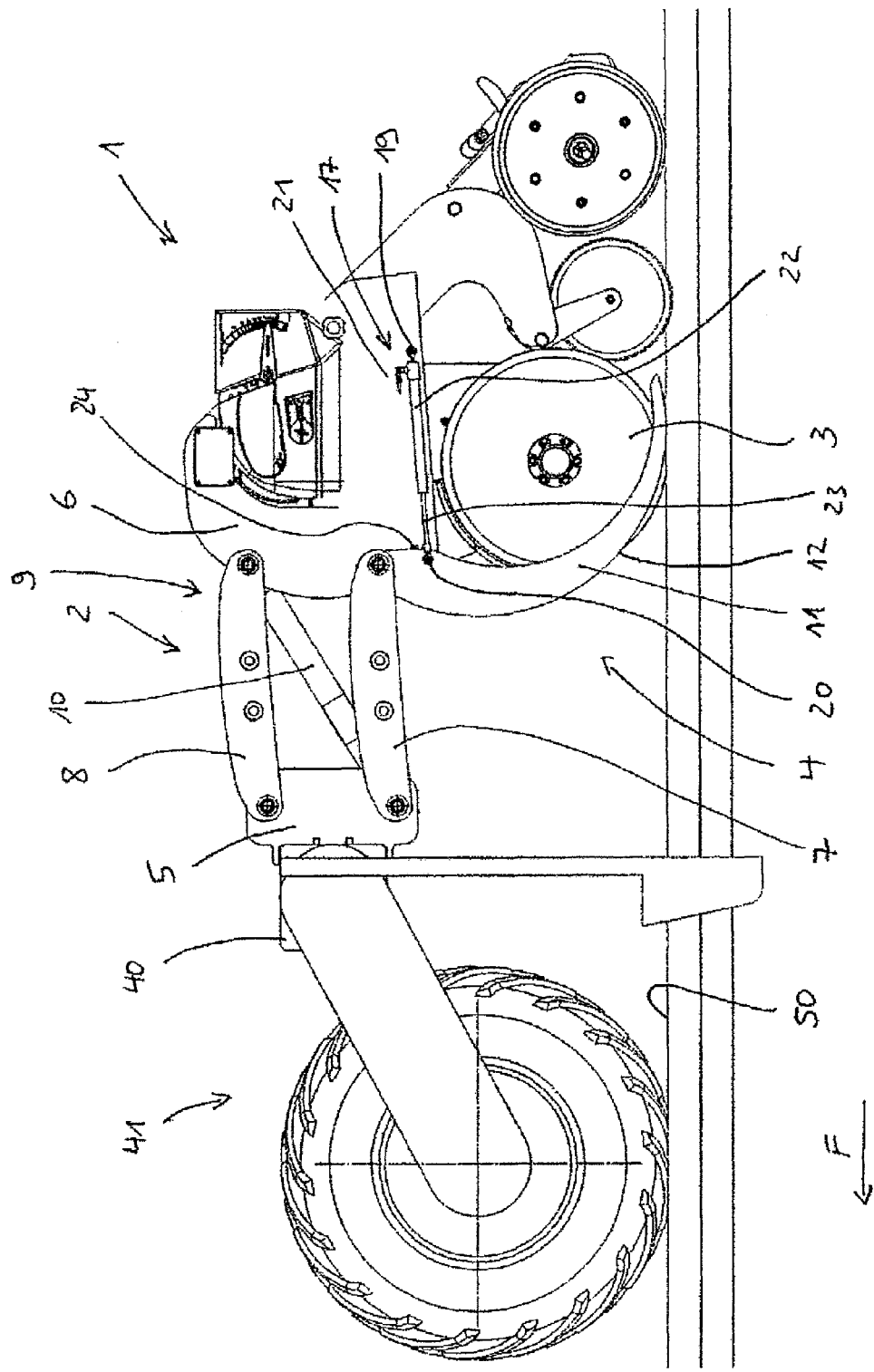

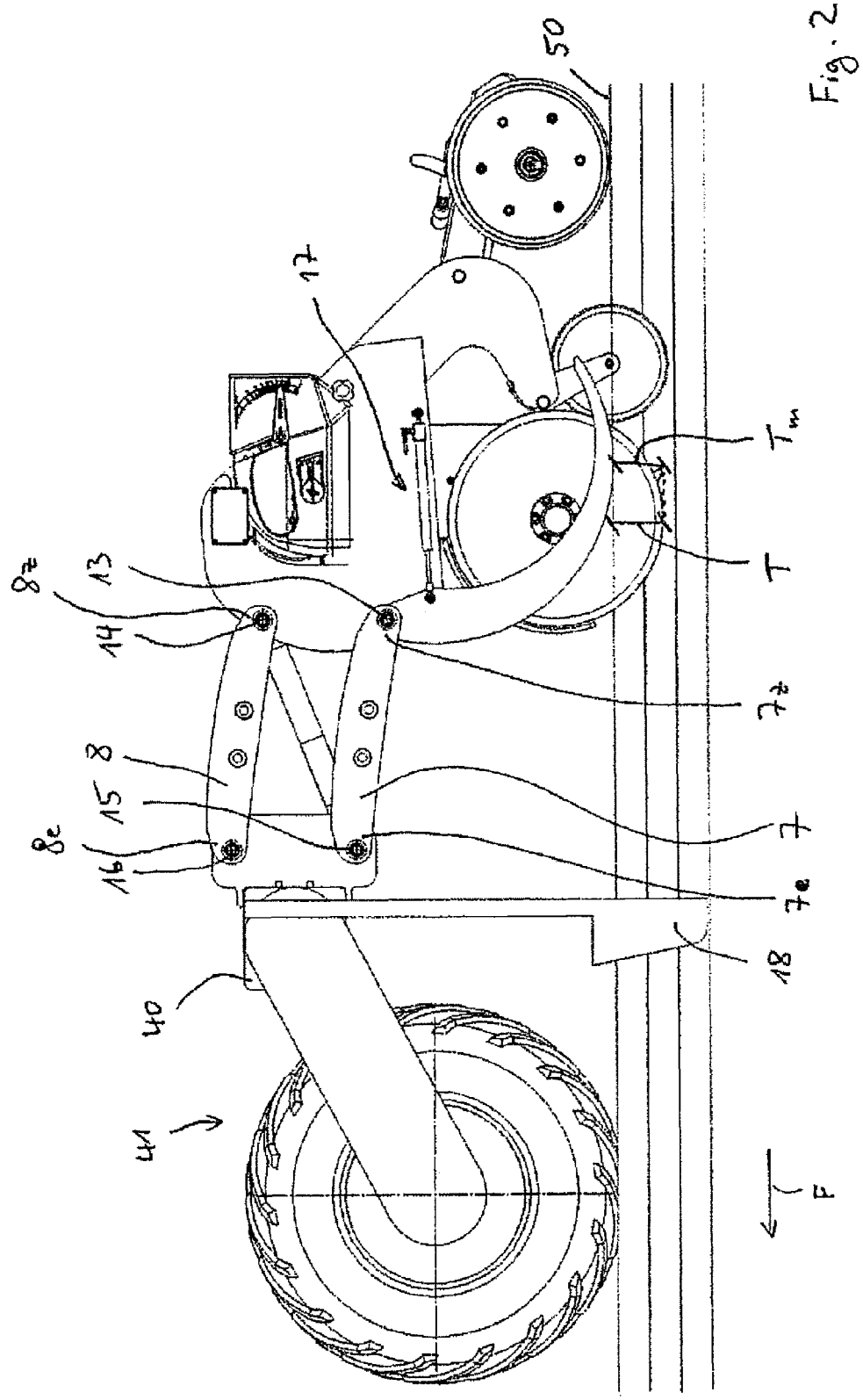

SOWING SHARE

FIELD OF THE INVENTION

This invention relates to a coulter and a sowing device.

BACKGROUND OF THE INVENTION

Sowing devices with coulters distributed uniformly along the sowing width for delivering agricultural materials, especially seed and/or fertilizer, into cultivated soil should ensure a uniform sowing depth/penetration depth and, after delivery of the seed/fertilizer, the pressing/closing of the furrow which is optimum for the respective seed conditions. In this case not only does the seed/fertilizer play a major part, but also the soil composition, such as for example the moisture content of the soil and mainly obstacles which are present in or on the soil, such as rocks.

SUMMARY OF THE INVENTION

The object of this invention is therefore to devise a coulter or a sowing device which is both structurally simple and provides for optimum delivery of the seed and/or fertilizer into the soil.

This object is achieved with the features of the independent claim(s). Advantageous developments of the invention are given in the dependent claims. All combinations of at least two of the features given in the specification, the claims and/or the figures also fall within the scope of the invention.

At the given value ranges, values within the indicated limits will also be considered to be disclosed as boundary values and will be claimed in any combination.

The invention is based on the idea of enabling the control/adjustment of the penetration depth by providing a height measuring apparatus for measuring the height of the coulter disc relative to the soil. A pressing roller or depth guide roller or wheel which in the past was responsible for fixing the penetration depth can be omitted. This yields not only a reduction of the weight and cost of the coulter, but also a structural improvement. This is because the width of the pressing rollers in the past limited the minimum distance between adjacent coulters. It can be distinctly reduced without a pressing roller so that more seed per sowing width of the sowing device can be delivered into the soil. An active application of force to the coulter disc by the coulter holder takes place depending on the control/adjustment, in particular by means of the measured penetration depth as a manipulated variable. In doing so in particular a corridor or a maximum and/or minimum penetration depth, in particular depending on the soil composition and/or the type of seed/fertilizer, can be stipulated. The minimum penetration depth is in particular at least 1 cm, the maximum penetration depth is in particular a maximum 15 cm, preferably a maximum 10 cm, still more preferably a maximum 6 cm. The penetration depth or the penetration depth corridor is chosen in particular depending on the agriculture materials which are to be output.

In a development of this invention it is advantageously provided that the coulter holder has a parallelogram arm with a lifting cylinder for adjusting the height. The parallelogram arm is formed in particular from two arms which are made parallel to one another and which are able to swivel. The arms are pivotally attached on one end to a fixing profile for attaching the coulter holder to the coulter frame and on the opposite end of the arms to a coulter element for accommodating the coulter disc. The lifting cylinder can be actuated hydraulically, but preferably electrically or pneumatically.

In another advantageous embodiment of the invention it is provided that the height is measured by means of the height measuring apparatus by mechanical contact with the soil, in particular by means of a measurement arm which is convexly curved in the direction of the soil, preferably on one contact surface. Mechanical contact with the soil enables exact measurement even over a long running time even with a heavy dirt burden in the region of the coulter. In particular the measurement arm of the height measuring apparatus is subjected to a force in the direction of the soil, preferably a spring force.

The height measuring apparatus is developed by a measurement arm which is pivotally coupled to one swivelling axis of the coulter holder. In particular the measurement arm viewed from its swivelling axis can be made tapering up to its opposite, in particular, free end. In particular the measurement arm has a sickle shape.

According to one advantageous embodiment it is provided that the measurement arm extends at least up to a penetration depth of the coulter disk equal to zero. Thus even when driving over a hard obstacle, such as for example a rock, it is ensured that the penetration depth continues to be measured even after driving over the obstacle.

To the extent the height measuring apparatus has a length measuring element which runs between the measurement arm and the coulter element, the penetration depth can be easily determined, in particular by vector computation of the movable axes which are being referenced. Alternatively the length measuring element can be replaced by an electronic distance sensor.

According to another advantageous embodiment of the invention it is provided that on the coulter, in particular in the direction of travel in front of the coulter disc, a moisture sensor for measuring the moisture content of the soil is attached. In this way in particular a corridor or the maximum and/or minimum penetration depth for the coulter disc can be established.

To the extent the penetration depth can be controlled/adjusted depending on the moisture content of the soil, optimum germination behavior can be ensured by one deposition depth of the seed at a time which is established in particular separately for each track.

According to the present invention there is disclosed a sowing device with a coulter frame and several coulters which are attached to the coulter frame. Features disclosed for the coulters should also be considered as disclosed for the sowing device. In particular, there is a sowing device with several coulters or with coulters which can be controlled/adjusted independently of one another with respect to the penetration depth and which are combined into several groups of coulters.

According to one embodiment of the present invention the maximum penetration depth and/or the corridor for the penetration depth is fixed depending on the type of soil and/or soil composition, in particular it can be automatically adapted by GPS determination.

The sowing depth or penetration depth can be adjusted centrally and/or without tools. Soil differences, for example due to tracks, do not influence the penetration depth or do so only insignificantly.

Other advantages, features and details of the invention will become apparent from the following description of preferred exemplary embodiments using the drawings.

BRIEF DESCRIPTION OF THE DRAWINGS

FIG. 1 shows a side view of a coulter in a first sowing position of the coulter disc and FIG. 2 shows a side view of the coulter according to FIG. 1 in a second sowing position of the coulter disc.

In the figures the same elements or elements with the same action are identified with the same reference numbers.

DETAILED DESCRIPTION OF THE PRESENT INVENTION

FIGS. 1 and 2 show a coulter 1 which has been attached to a coulter frame 40. The attachment takes place by a fixing profile 5 which can be fixed on the coulter frame 40 without degrees of freedom, along the coulter frame 40 (therefore into the plane of the drawings) there being several coulters 1 next to one another. For the sake of simplicity, only a single coulter 1 is shown.

One arm 7, 8 at a time is coupled to the fixing profile 5 in two swivelling axes 15, 16 which are located on top of one another, each on a first end 7e, 8e of the arms 7, 8. A coulter element 6 is coupled to the respectively opposite second end 7z, 8z of the arms 7, 8 in two swivelling axes 13, 14. The arms 7, 8 run parallel to one another. A lifting cylinder 10 runs between one obliquely opposite swivelling axis 13, 14, 15, 16 at a time, in the illustrated exemplary embodiment between the swivelling axes 14 and 15; the arrangement of the lifting cylinder 10 between the swivelling axes 13 and 16 would also be conceivable. The fixing profile 5, the arms 7, 8 and the coulter element 6 as well as the lifting cylinder 10 jointly form a coulter holder 2 for swivelling holding of a coulter disk 3. The coulter disk 3 is attached to the coulter holder 2, in particular to the coulter element 6, preferably without a degree of freedom, except optionally rotation around its own axis.

By attaching the coulter disc 3 to a coulter holder 2 which is equipped with a parallelogram arm 9 the coulter disc 3 can be adjusted in its height relative to the coulter frame 40 by means of the coulter holder, the alignment of the coulter disc 3 relative to the coulter element 6 remaining roughly constant relative to the soil 50, based on the parallel displacement of the swivelling axes 13, 14 to the swivelling axes 15, 16.

Due to the omission of a pressing roller, to set a penetration depth T of the coulter disc 3 into the soil 50, there is a height measuring apparatus 4 on the coulter 1.

The height measuring apparatus 4 consists of a measurement arm 11 with a contact surface 12 which makes contact with the soil 50, and which is convexly curved in the direction of the soil and towards the direction of travel in order to follow the soil 50 or possible ground unevenness, therefore the soil surface even at different penetration depths according to FIG. 1 or FIG. 2. The measurement arm 11 is attached with a swivelling capacity to the swivelling axis 13 and thus is referenced to the coulter disc 3 which is attached to the coulter element 6. The swivelling axis 13 is located in particular in the direction F of travel upstream of one axis of rotation of the coulter disc 3. Alternatively one swivelling axis of the measurement arm 11 could also be located behind the axis of rotation of the coulter disc 3.

When the height of the coulter element 6 and thus of the coulter disc 3 changes relative to the soil 50, the measurement arm 11 thus swivels around the swivelling axis 13. This swivelling motion is measured by a length measuring element 17 and from the measured value of the change in the length of the length measuring element 17 the change of the penetration depth and after corresponding calibration the penetration depth $T_m$ can be determined. The determined value of the measured penetration depth $T_m$ will then be used as a setpoint for a corresponding control circuit for controlling the height adjustment of the coulter disc 3.

The length measuring element 17 measures the distance between a first fixed point 19 on the coulter element 6 and a second fixed point 20 on the measurement arm 11. To do this the length measuring element 17 preferably has a hollow cylinder 22 which is attached to the first fixed point 19 with a capacity to swivel, and on which in the region of the first fixed point 19 a distance measuring apparatus 21 is attached. In the hollow cylinder 22 a rod 23 is guided to be able to slide and is fixed with a swivelling capacity in the region of the second fixed point 20 on the measurement arm 11. A measuring element 24 is attached to the rod and its distance from the distance measuring apparatus 21 is measured. The swivelling motion of the measurement arm 11 changes the distance of the first fixed point 19 to the second fixed point 20 and by the values which have been determined by the distance measuring apparatus 21 the change of the penetration depth T can be measured and made available as the measured penetration depth $T_m$ to a corresponding control/adjustment apparatus for controlling/adjusting the height setting.

Furthermore the coulter or the sowing device has a moisture sensor 18 which in the illustrated exemplary embodiment is attached to the coulter frame 40. The moisture sensor is located in the direction F of travel upstream of the coulter disc 3 in order to have enough time for setting the penetration depth T after measuring the moisture content. In particular, the value of the moisture content is used to establish a corridor, in particular between 3 cm and 6 cm penetration depth T, within which the penetration depth is controlled/adjusted.

According to one alternative preferred embodiment the moisture sensor is located in the direction of travel downstream of the coulter disc 3 since the moisture sensor in this embodiment is protected against damage by the coulter disc 3 and a measurement is taken at the set depth without the moisture sensor having had to penetrate into the soil to any notable degree.

REFERENCE NUMBER LIST 1 coulter
2 coulter holder
3 coulter disc
4 height measuring apparatus
5 fixing profile
6 coulter element
7 arm
7e first end
7z second end
8 arm
8e first end
8z second end
9 parallelogram arm
10 lifting cylinder
11 measurement arm
12 contact surface
13 swivelling axis
14 swivelling axis
15 swivelling axis
16 swivelling axis
17 length measuring element
18 moisture sensor 19 first fixed point
20 second fixed point
21 distance measuring apparatus
22 hollow cylinder
23 rod
24 measuring element
40 coulter frame
41 undercarriage
50 soil
F direction of travel
T penetration depth
$T_m$ measured penetration depth Having described the invention, the following is claimed:

1. A coulter attachable to a coulter frame, said coulter comprising:
   a coulter disc for delivering agricultural materials into soil along a direction of travel;
   a coulter holder for adjusting the height of the coulter disc relative to the coulter frame, said coulter holder including:
     a parallelogram arm member,
     a lifting cylinder, wherein actuation of the lifting cylinder adjusts the height of the coulter disc, and
     a coulter element for coupling the coulter disc to the coulter holder, said coulter element pivotally coupled to the parallelogram arm member to pivot about a swivelling axis of the coulter holder; and
   a height measuring apparatus located in a region of the coulter disc for use in determining a measured penetration depth $T_m$ indicative of a penetration depth T of the coulter disc into the soil, said height measuring apparatus including a measurement arm for mechanically contacting the soil, wherein the measurement arm is pivotally coupled to the coulter holder to pivot about said swivelling axis of the coulter holder,
   wherein the penetration depth T of the coulter disc into the soil is adjustable in accordance with the measured penetration depth $T_m$.

2. The coulter as claimed in claim 1, wherein said coulter element is pivotally coupled to the parallelogram arm member to pivot about a plurality of swivelling axes of the coulter holder.

3. The coulter as claimed in claim 1, wherein the measurement arm has a contact surface that is convexly curved in a direction facing toward the soil.

4. The coulter as claimed in claim 1, wherein the measurement arm has a length that extends at least up to a penetration depth T of the coulter disc equal to zero.

5. The coulter as claimed in claim 1, wherein the height measuring apparatus further comprises:
   a length measuring element extending between the measurement arm and the coulter element.

6. The coulter as claimed in claim 1, wherein the coulter further comprises:
   a moisture sensor for measuring the moisture content of the soil, wherein said moisture sensor is located in front of the coulter disc in the direction of travel.

7. The coulter as claimed in claim 6, wherein the penetration depth T of the coulter disc into the soil is adjustable in accordance with the moisture content of the soil.

8. The coulter as claimed in claim 1, wherein the coulter holder further comprises a fixing profile for attaching the coulter holder to the coulter frame.

9. The coulter as claimed in claim 1, wherein said height measuring apparatus includes an electronic distance sensor.

10. The coulter as claimed in claim 1, wherein said measurement arm, as viewed in a direction of said swivelling axis, is tapered from the swivelling axis towards a free end of said measurement arm.

11. The coulter as claimed in claim 1, wherein said measurement arm is subjected to a force in a direction toward the soil.

12. A sowing device comprising:
    a coulter frame;
    at least one coulter attachable to the coulter frame, each coulter including:
      a coulter disc for delivering agricultural materials into soil along a direction of travel;
      a coulter holder for adjusting the height of the coulter disc relative to the coulter frame, said coulter holder including:
        a parallelogram arm member,
        a lifting cylinder, wherein actuation of the lifting cylinder adjusts the height of the coulter disc, and
        a coulter element for coupling the coulter disc to the coulter holder, said coulter element pivotally coupled to the parallelogram arm member to pivot about a swivelling axis of the coulter holder; and
      a height measuring apparatus located in a region of the coulter disc for use in determining a measured penetration depth $T_m$ indicative of a penetration depth T of the coulter disc into the soil, said height measuring apparatus including a measurement arm for mechanically contacting the soil, wherein the measurement arm is pivotally coupled to the coulter holder to pivot about said swivelling axis of the coulter holder,
      wherein the penetration depth T of the coulter disc into the soil is adjustable in accordance with the measured penetration depth $T_m$.

13. The sowing device as claimed in claim 12, wherein said sowing device includes a plurality of said coulters, each coulter independently controlled with respect to the penetration depth T of the coulter disc into the soil.

14. The coulter as claimed in claim 8, wherein the parallelogram atm member of the coulter holder includes first and second arms located parallel to each other, a first end of each arm pivotally coupled to the fixing profile and a second end of each arm pivotally coupled to the coulter element.

15. The coulter as claimed in claim 11, wherein said force is a spring force.

* * * * *